US006757763B1

(12) United States Patent
Preiss et al.

(10) Patent No.: US 6,757,763 B1
(45) Date of Patent: Jun. 29, 2004

(54) UNIVERSAL SERIAL BUS INTERFACING USING FIFO BUFFERS

(75) Inventors: Frank Preiss, Santa Cruz, CA (US); Christian Staudt, Santa Clara, CA (US); Joerg Hartung, Los Gatos, CA (US)

(73) Assignee: Infineon Technologies North America Corpration, San Jose, CA (US)

( * ) Notice: Subject to any disclaimer, the term of this patent is extended or adjusted under 35 U.S.C. 154(b) by 0 days.

(21) Appl. No.: 09/545,393

(22) Filed: Apr. 7, 2000

(51) Int. Cl.[7] .................... G06F 13/42; G06F 13/14; G06F 13/36

(52) U.S. Cl. .................. 710/105; 710/106; 710/305; 710/306

(58) Field of Search .................. 710/36–57, 305–315, 710/71, 105, 106; 713/501

(56) References Cited

U.S. PATENT DOCUMENTS

| 4,451,916 | A | * | 5/1984 | Casper et al. ............. 359/110 |
| 5,335,325 | A | * | 8/1994 | Frank et al. ............. 711/163 |
| 5,345,559 | A | * | 9/1994 | Okazaki et al. .......... 711/163 |
| 5,815,509 | A | * | 9/1998 | Deng et al. ............. 714/719 |
| 5,987,617 | A | * | 11/1999 | Hu et al. ................ 713/320 |
| 6,011,407 | A | * | 1/2000 | New .................... 326/39 |
| 6,098,110 | A | * | 8/2000 | Witkowski et al. ........ 370/412 |
| 6,256,687 | B1 | * | 7/2001 | Ellis et al. .............. 710/53 |
| 6,336,159 | B1 | * | 1/2002 | MacWilliams et al. ..... 710/105 |

* cited by examiner

Primary Examiner—Sumati Lefkowitz
Assistant Examiner—Trisha Vu
(74) Attorney, Agent, or Firm—Fish & Richardson P.C.

(57) ABSTRACT

An improved Universal Serial Bus interface employing FIFO buffers (300, 800) for interfacing to an application bus and a microprocessor bus, in particular, an XBUS. The interface includes a plurality of transmit/receive channels (114) multiplexed to the application bus and the XBUS. Each transmit channel includes a transmit FIFO buffer (300), a transmit write buffer (308), a transmit push buffer (310), and three transmit state machines: a transmit write state machine (302), a transmit interrupt state machine (313), and a transmit push state machine (313). The transmit state machine (302) and the transmit FIFO (300) are clocked in the USB domain. The transmit write register (308) is clocked in the XBUS domain. Each receive channel includes a receive FIFO buffer (800), a receive state machine (802), and a receive register (806). The receive FIFO (800), the receive state machine (802), and the receive register (806) are all clocked in the USB domain.

10 Claims, 17 Drawing Sheets

US 6,757,763 B1

UNIVERSAL SERIAL BUS INTERFACING USING FIFO BUFFERS

BACKGROUND OF THE INVENTION

1. Field of the Invention

The present invention relates to bus interfaces, and in particular, to a system and method for interfacing a Universal Serial Bus controller (UDC) which is connected to the USB and an XBUS.

2. Description of the Related Art

The Universal Serial Bus (USB) is a bi-directional, isochronous, dynamically attachable serial interface providing two wire point to point signaling. Signals are differentially driven at a bit rate of 12 megabits per second.

Typically, a USB host controller is incorporated into a bus bridge which couples the USB to a peripheral bus. Such a peripheral bus typically runs at a different clock than the USB. As such, there is a need to synchronize the USB data with the peripheral bus data.

While the Universal Serial Bus is intended as an industry-wide standard peripheral interface, the USB Specification does not define the relationship between components in USB devices or in computer systems employing the USB.

SUMMARY OF THE INVENTION

These and other drawbacks in the prior art are overcome in large part by a Universal Serial Bus interface according to the present invention. Briefly, an improved Universal Serial Bus interface employing FIFO buffers for interfacing to the application bus of the UDC and an XBUS is provided. The interface includes a plurality of transmit/receive channels multiplexed to the USB and the XBUS.

Each transmit channel includes a transmit FIFO buffer, a transmit write buffer, a transmit push buffer, and three transmit state machines: a transmit write state machine, a transmit interrupt state machine, and a transmit push state machine. The transmit state machine and the transmit FIFO are clocked in the USB domain. The transmit write register is clocked in the XBUS domain. Each receive channel includes a receive FIFO buffer, a receive state machine, and a receive register. The receive FIFO, the receive state machine, and the receive register are all clocked in the USB domain.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–18 illustrate an improved system and method for interfacing a Universal Serial Bus (USB).

System Overview

Figure 1:
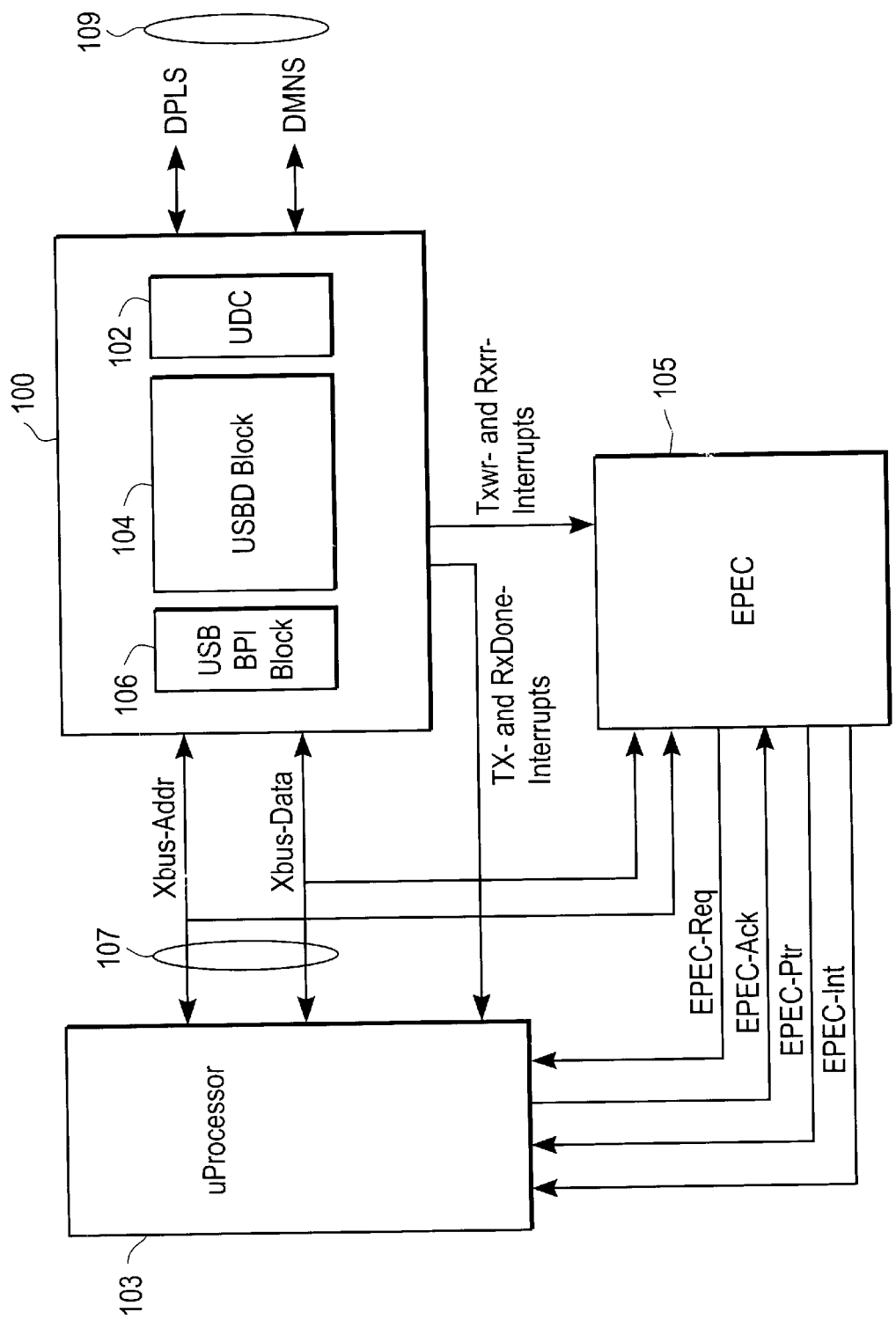
FIG. 1 is a block diagram of an exemplary bus interface system according to an implementation of the invention.

Turning now to the drawings and, with particular attention to FIG. 1, a block diagram of an exemplary bus interface system according to the present invention is shown therein and generally identified by the reference numeral 100. The bus interface system 100 includes a Universal Serial bus device controller (UDC) 102, a bus interface (USBD) 104 and an XBUS interface 106. As will be explained in greater detail below, the bus interface 104 includes a plurality of FIFO (First in-first out) buffers according to the present invention. The XBUS interface 106 couples via a data bus to a microprocessor 103 and an "external peripheral event controller" (EPEC) 105. The EPEC 105 transmits data from a memory location (not shown) to the USB and vice versa responsive to an interrupt, as will be described in greater detail below.

Figure 2A:
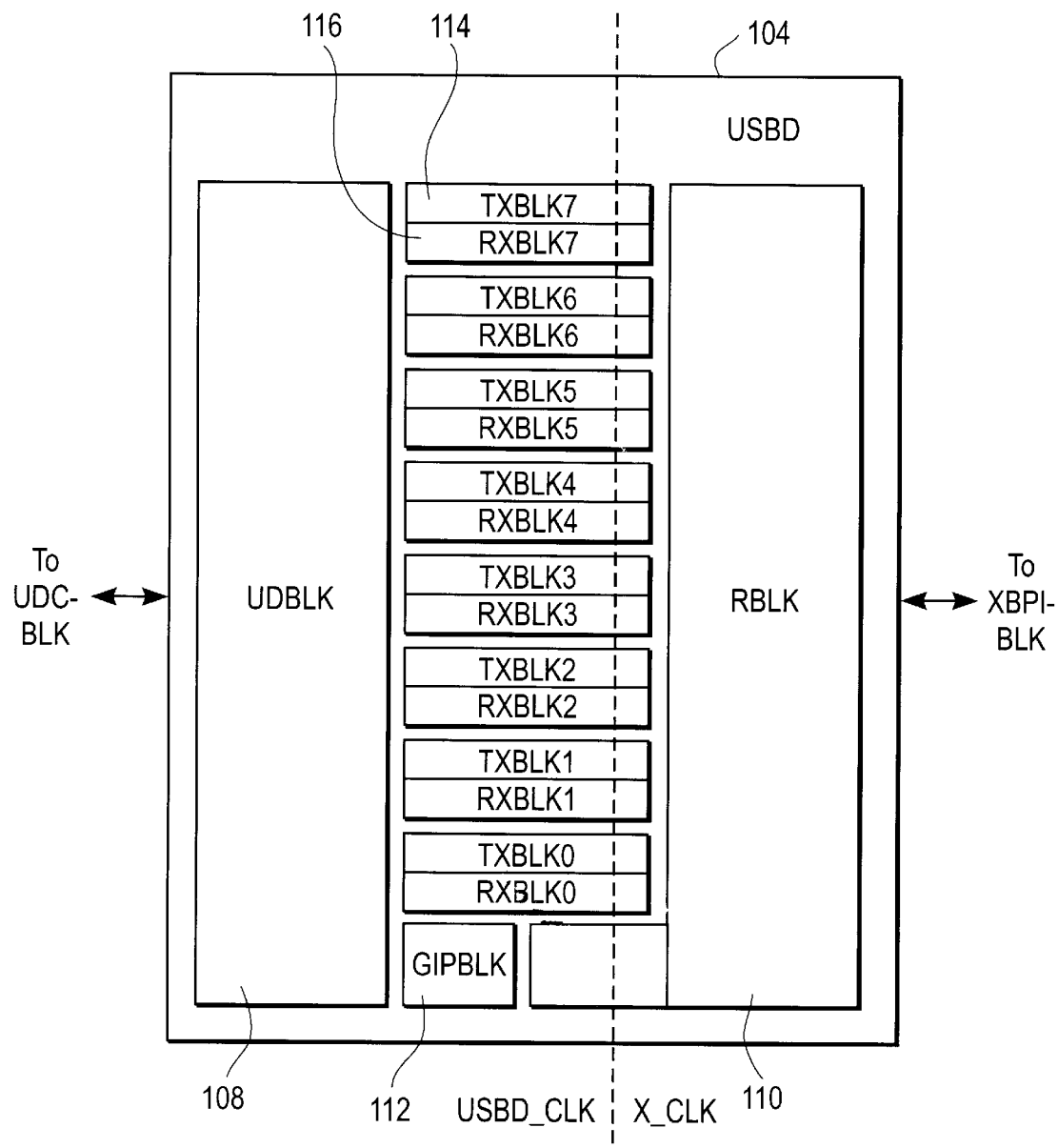
FIGS. 2A and 2B illustrate an exemplary bus interface according to an implementation of the invention.

The bus interface 104 is illustrated in greater detail with reference to FIG. 2A. As shown, the bus interface 104 includes a Universal Serial Bus device interface block (UDBLK) 108 for interfacing to the Universal Serial Bus device 102. Also included are a register block (RBLK) 110, an interrupt generator block (GIPBLK) 112, and a plurality of multiplexed transmit and receive blocks 114, 116, (TXBLKx, RXBLKx) respectively. The UDBLK 108, the GIPBLK 112 and the TXBLKx 114 and RXBLKx are clocked by the USBD_CLK and the RBLK 110 is clocked by the XBUS clock (X_CLK).

Figure 2B:
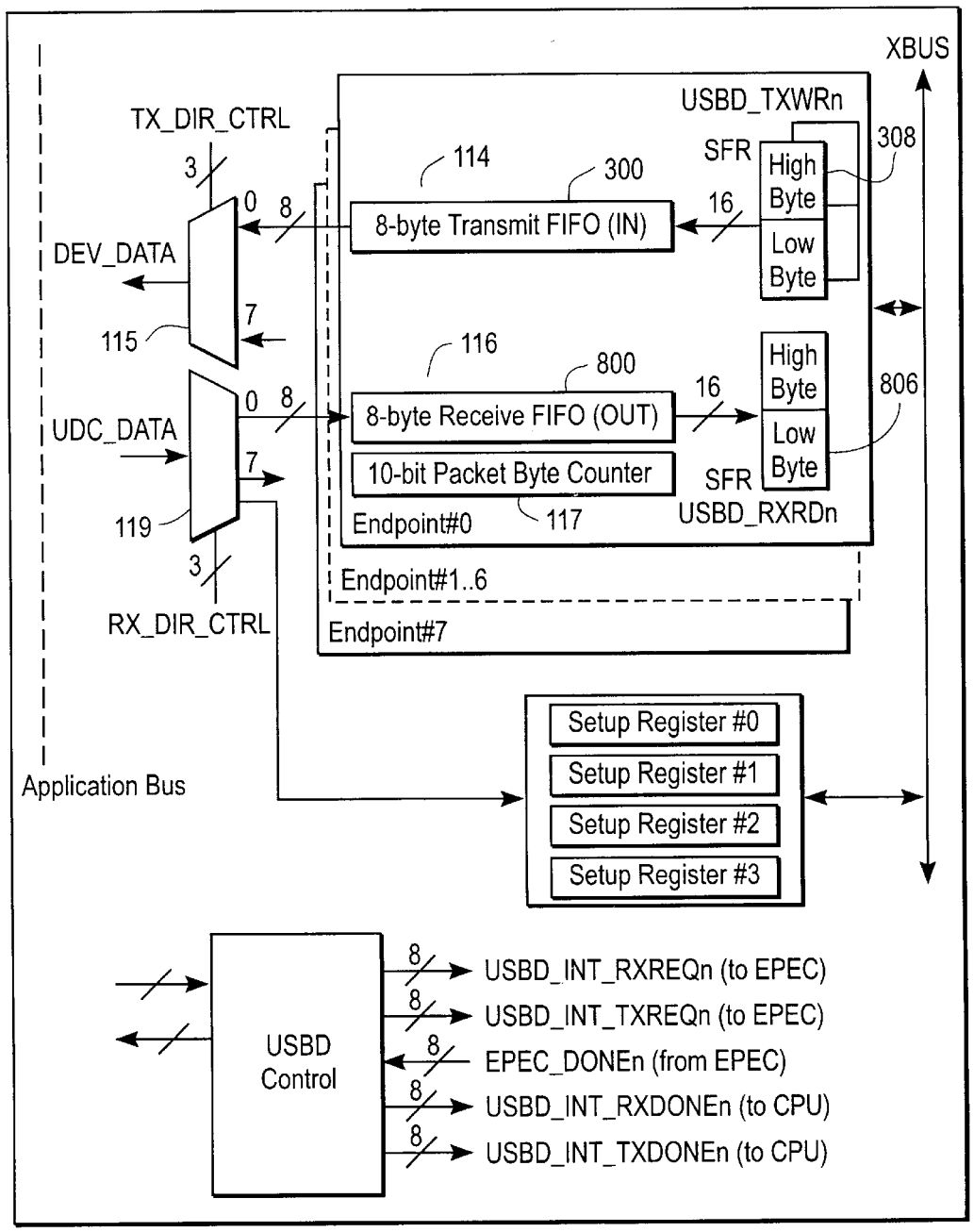

As shown in FIG. 2B, each TXBLK 114 includes a FIFO 300 and a transmit register 308. Each RXBLK 116 includes a receive FIFO 800 and a receive register 806. Further, each transmit receive channel includes a 10 bit packet byte counter 117, as will be explained in greater detail below. The transmit and receive registers couple the transmit/receive channels to the XBUS. The transmit/receive channels are coupled to the USB via a transmit multiplexer 115 and a receive multiplexer 119.

As will be explained in greater detail below, each endpoint FIFO pair generates two transfer request interrupts to the EPEC 105. The USBD_TXREQn interrupt indicates that the transmit FIFO is able to accept words from the XBUS. The USBD_RXREQn interrupt indicates that a valid word is in the Receive FIFO. Further, each transmit/receive pair generates two status interrupts to the CPU. The USBD_INT_RXDONEn interrupt indicates that the reception is complete. The USBD_INT_TXDONEn interrupt indicates that the transmission is complete.

Data requested by Transmit FIFOs are transferred from an internal/external memory location to the endpoint FIFO by the EPEC 105 injecting MOV instructions into the decode stage of the instruction pipeline. Data available by Receive FIFOs is transferred from the endpoint FIFO to an internal/external memory location by the EPEC 105 injecting MOV instructions into the decode stage of the instruction pipeline. In both directions, the software controls the EPEC 105 providing DMA like source and destination pointers on a per packet basis.

Figure 18:
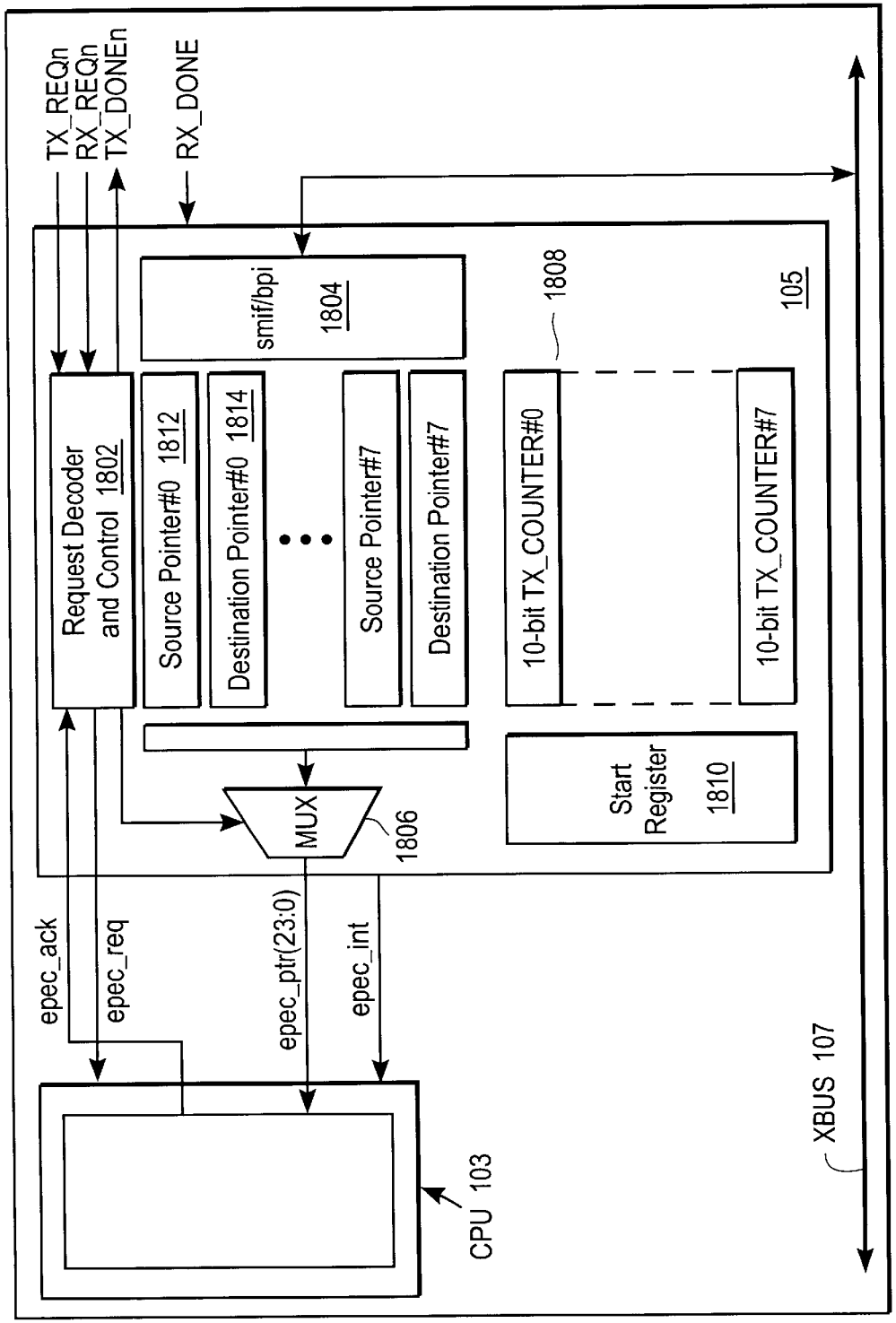
FIG. 18 illustrates an exemplary external peripheral event controller according to an implementation of the invention.

The EPEC 105 is illustrated in greater detail in FIG. 18. Briefly, the EPEC 105 provides a DMA controller to the USB device. The EPEC 105 is implemented as a 9-channel controller with a 24 bit source pointer 1812, a 24 bit destination pointer 1814, and a 10 bit transmit byte length counter 1808 with terminal count indication, per channel. For a transmit operation, the counter starts at 0 and counts up to a terminal value, written to the start register 1810 by software. For receive, the counter's start register is programmed to the maximum number of bytes which can be received and counts down until it gets to 0 or the packet is received completely.

The EPEC 105 further includes a request decoder and control 1802 for processing transmit and receive requests and a multiplexer 1806 for multiplexing the source and destination pointers 1812, 1814 to the processor 103. A bus interface is further provided to interface to the XBUS.

In operation, the TX_REQn and RX_REQn (the TXWR- and RXRR-interrupts of FIG. 1 generated by the USB-block) are received to request a transmit or a receive operation, including an identification of the channel. The corresponding transmit counter, which is programmed by software before the transfer is enabled, starts a countdown as each word or byte (by default, a word is transferred; only the last transfer of a packet is permitted to be a byte-transfer) is transferred. After the terminal count is reached, the counter stops and sends the TX_DONE pulse to the USBD and triggers the EPEC_INT interrupt to the processor 103. The processor 103 then executes an interrupt routine to determine the source of the interrupt and also acknowledges the interrupt.

IN Transactions (Device to Host: TX)

Figure 3A:
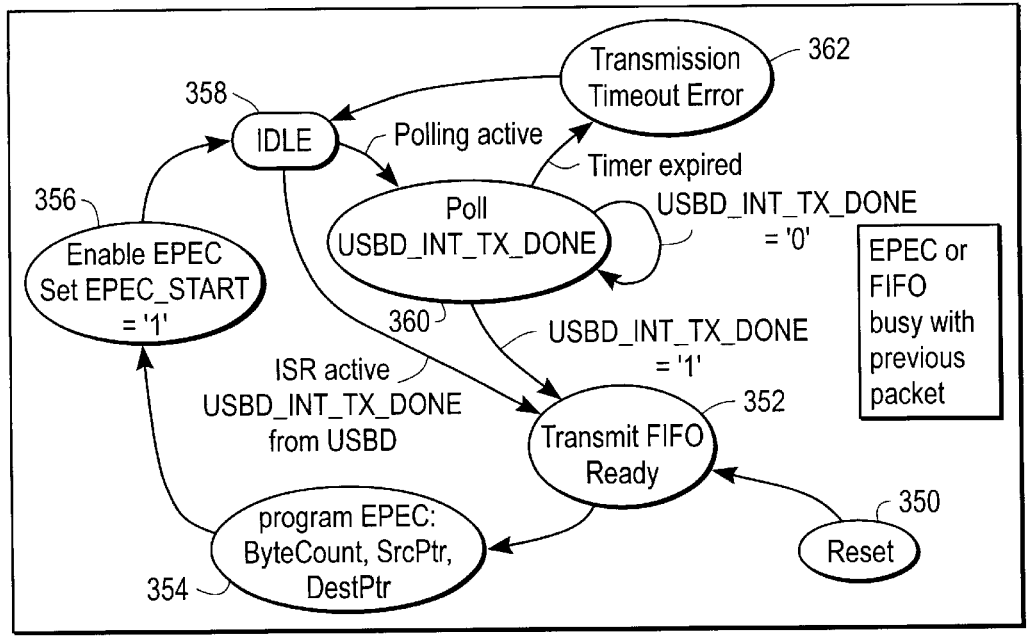
FIGS. 3A and 3B are diagrams illustrating IN and OUT transactions according to one implementation of the invention.

The host requests device data by using the IN transaction. The IN transaction is illustrated in FIG. 3A. Upon reset (350), the USBD 104 enters a Transmit FIFO Ready state 352. The device software provides a new packet by setting up a new source and destination pointer within the EPEC (state 354), which are then provided to the processor 103. Since the packet length of the last packet is either 0 or less than the maximum defined packet length, the 10 bit byte counter is provided in the EPEC (356). After reaching its terminal count, the EPEC 105 stops transferring data, sets the EPEC_DONEn pulse signaling to the USB core the USB End of Packet signal and sets the EPEC interrupt EPEC_INT. If the counter expires, the system returns to the Idle state (358, 362). The counter is loaded by the software for each packet to be transferred.

The new packet transfer is started by setting the EPEC_STARTn bit in the EPEC register EPEC_CMD (not shown). This bit enables the word transfer request USBD_INT_TXREQ generated by the transmit FIFO. Whether the last EPEC transfer was a word or byte transfer is handled by the EPEC for transmit data.

The UDC 102 requests data handshakes from the application within a single UDC clock cycle. Consequently, the software has to provide the next data packet to the transmit FIFO before the host requests data, i.e., in order to prevent the FIFO from starvation resulting in a NACK to the host. This is achieved by either polling for the USBD_TXDON.En for a bit being asserted indicating a free FIFO or by providing the next packet as soon as the previous packet has been transmitted completely, using the USBD_INT_TXDONE directly (360). Zero data length packets are sent from software to the host by writing into the TxEOD register.

OUT Transactions (Host to Device: RX)

Figure 3B:
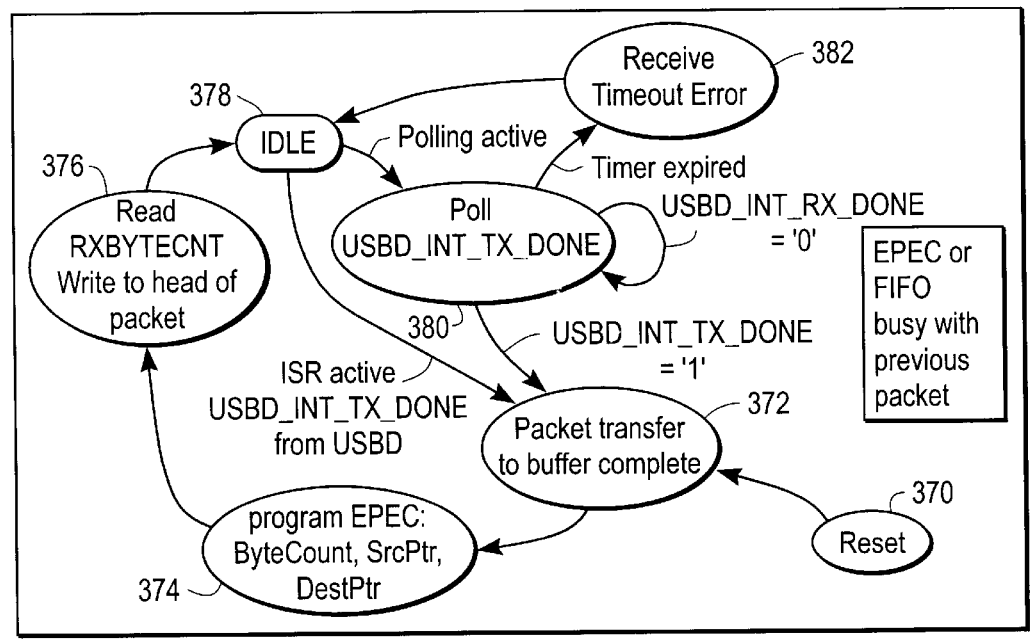

The host transmits device data by using the OUT transaction. The OUT transaction mechanism handled by the device HW/SW is similar to the IN transaction and is shown in FIG. 3B.

The UDC requests data handshakes from the application within four UDC clock cycles (@12 MHz). Consequently, the system has to provide the next empty receive buffer 806 to the Receive FIFO 800 in time to prevent the FIFO from overflow and resulting in a NACK to the host. This can be achieved by either polling for the USBD_RXDONEn bit for being asserted, indicating an empty Receive FIFO 800 or by providing the next receive buffer 806 as soon as the previous packet has been received completely (372), using the interrupt USBD_INT_RXDONE directly (380).

As noted above, the USBD provides a 10-bit byte counter USBD_RXBYTECNTn 117 for each endpoint Receive FIFO for counting the data strobe pulses asserted by the UDC. A completed packet transfer over the application bus (either XferAck or XferNack) will stop the byte counter 117 and the counter value will be copied into the USBD_RXBYTECNTn register along with a packet status information (E.g. packet valid). As soon as the complete packet has been transferred by the EPEC 105, an endpoint receive interrupt USBD_INT_RXDONE will be generated.

A new packet can only be received if the RX FIFO 800 is empty, i.e. the EPEC 105 has transferred the last byte/word. The next packet cannot be accepted by the very same Receive FIFO 800 until the counter value has been cleared by a CPU read access. Therefore, once the counter is read and cleared the EPEC is enabled again, the system has to load the EPEC with a new source and destination pointers (374) before reading the counter register. This enables the word transfer request USBD_INT_RXREQ generated by the Receive FIFO and EPEC 105 starts transferring words. Whether the last EPEC transfer was a word or byte transfer will be indicated by a USBD_RXBYTECNT value (376).

Transmit Block

Figure 4:
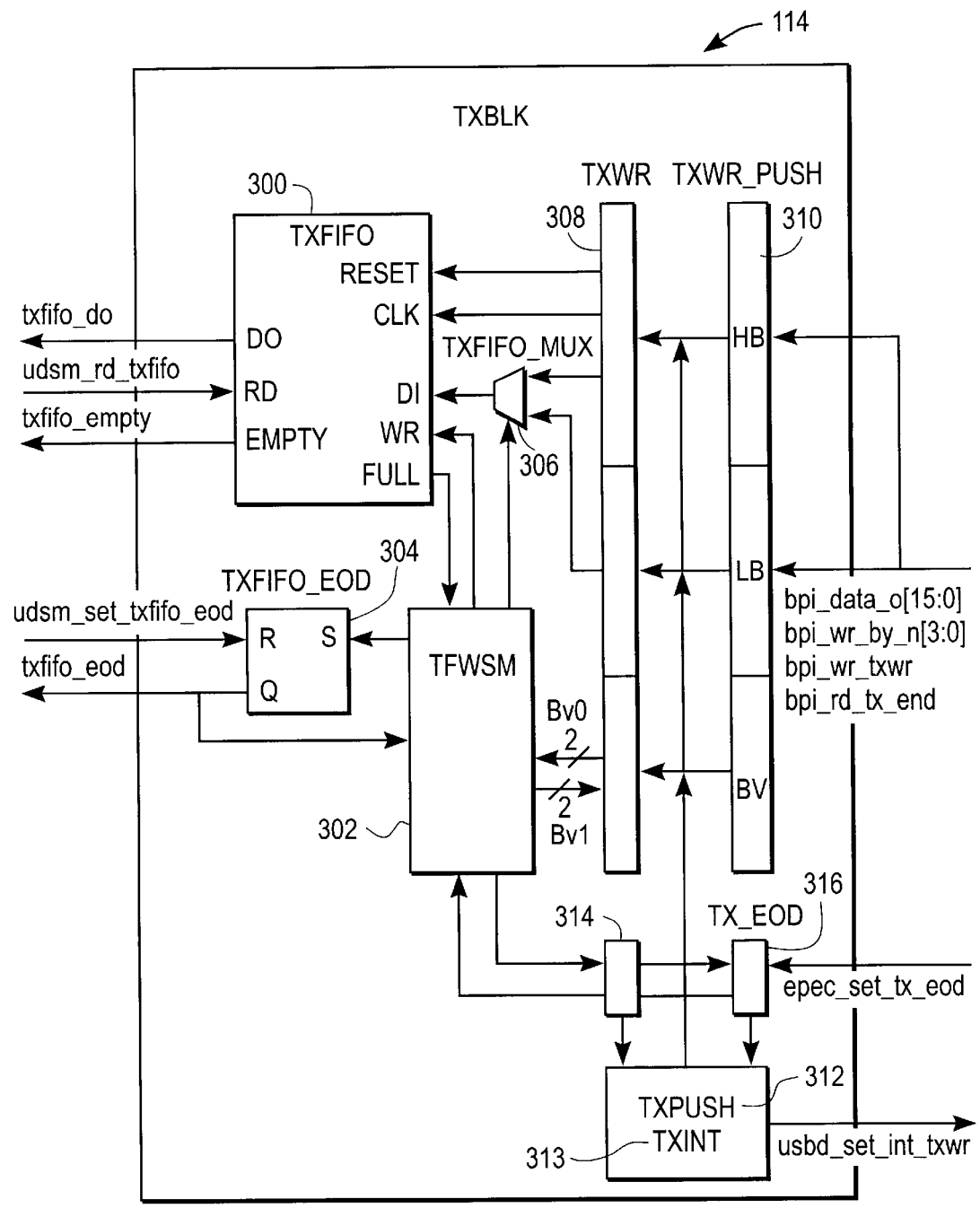
FIG. 4 is a diagram illustrating an exemplary transmit block according to an implementation of the invention.
Figure 12:
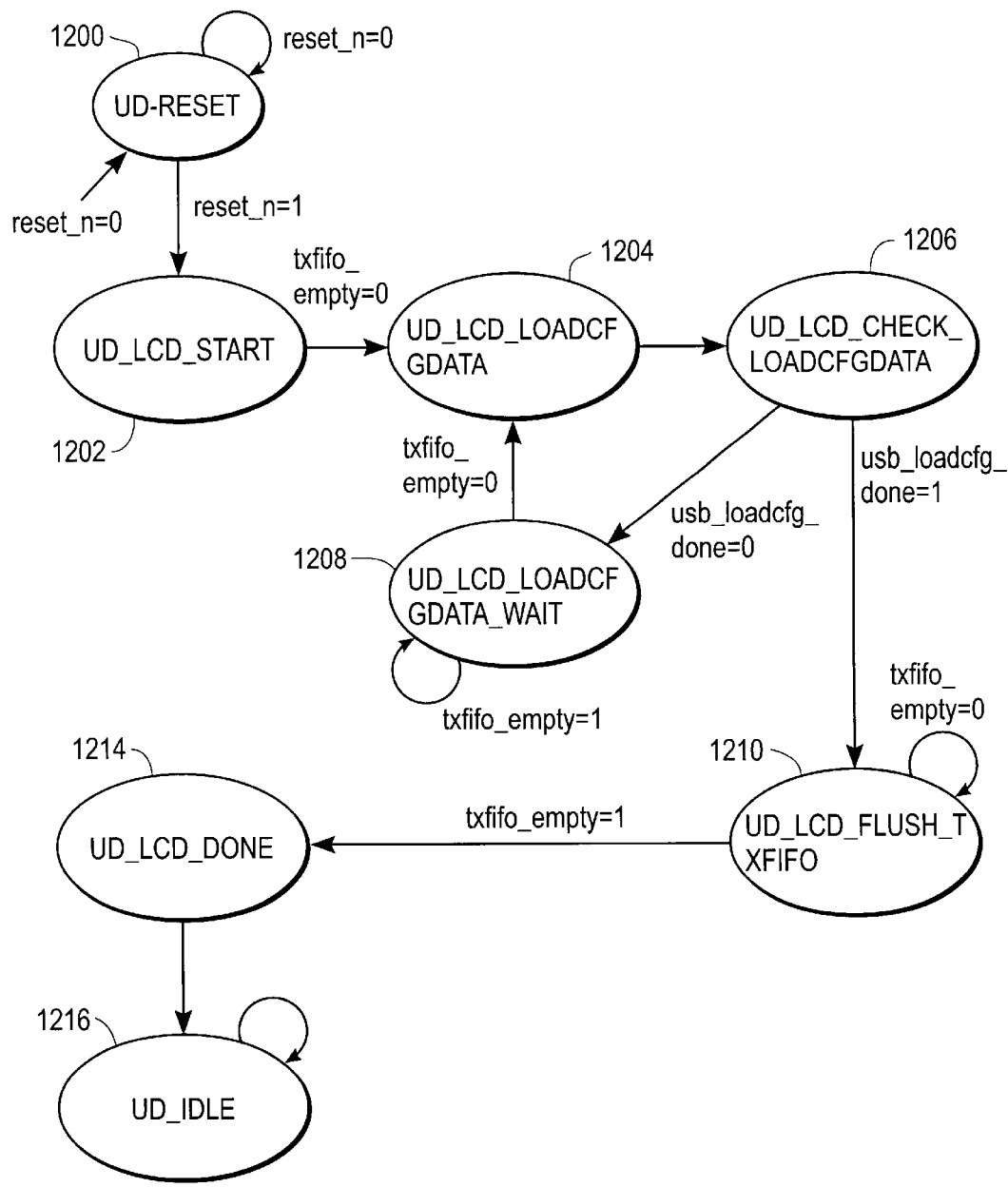
FIG. 12 illustrates a Load Configuration Data state machine according to an embodiment of the invention.

An exemplary transmit block 114 is shown in FIG. 4. As will be explained in greater detail below, the transmit block 114 provides a transmit channel with a 16 bit interface to the Xbus and an 8 bit interface to the UDSM (FIG. 12). As shown in FIG. 4, the transmit block 114 includes a transmit FIFO (TXFIFO) 300, which may be embodied as an 8 element deepx8 bit wide synchronous FIFO with separate Read and Write ports. The transmit block 114 further includes a 16 bit transmit write register (TXWR_PUSH) buffer 310 writeable from the Xbus, a 16 bit register for fast transmit write (TXWR) interrupt generation 308, and three state machines: a transfer state machine (TFSWM) 302 to handle the data transfer between the TXWR 308 and the transmit FIFO 300, a push state machine (TXPUSH) 312 to handle the pushing from the TXWR_PUSH register 310 to the TXWR register 308, and an interrupt generation state machine (TXINT) 313.

The TXWR 308 is write accessible to the XBUS, and is clocked by the X_CLK. The TXFIFO 300 and the TFWSM 302 belong to the USBD_CLK clock domain. The XBUS can write 1 byte or 2 byte data into the TXWR register 308. As such, two byte_valid tag bits (BVO and BV1) are used to indicate valid data bytes in the TXWR register 308. These tag bits are synchronized to the USBD_CLK domain and used as handshake signals by the TFWSM state machine 302. When the TFWSM state machine 302 receives the synchronized byte valid tag bits, the data in the TXWR register 308 is guaranteed to be stable and is used without further synchronization logic. The tag bits are set by XBUS writes to the TXWR register 308 and are reset asynchronously (with USBD_CLK) by the TFWSM state machine 302 when the data in the TXWR register 308 has been processed.

The transmit FIFO 300 is an 8 element deep by 8 bit wide dual port synchronous FIFO. The Write port (WR) is controlled by the TFSWM state machine and the Read port (RD) is controlled by the UDSM state machine (FIG. 12) through the channel multiplexer logic. The FIFO 300 provides three status signals: fifo_full, fifo_empty, and fifo_count. An entity that writes into the FIFO (e.g., TFWSM) should monitor the fifo_full signal and should not write when it is asserted. Similarly, an entity that reads from the FIFO 300 (e.g., UDSM) should monitor fifo-empty signal and not read when it is asserted. The fifo_count signal indicates the number of elements in the FIFO at any given time. Internally, the FIFO 300 is implemented as a circular buffer with read and write pointers.

To indicate the transmit End of Data, a one bit register (TXEOD) 316 is used, which is set by the software to indicate a transmit stream's end of data is cleared by the TFWSM 302 only after all the data bytes in the TXFIFO have been processed (or transmitted across the UDC's application bus interface). A corresponding TX_DONE interrupt is generated to indicate to the software that the status of the lately sent packet is available in the USBD_STATUS1 register and TXBLK is ready for the next transmit packet.

Figure 5:
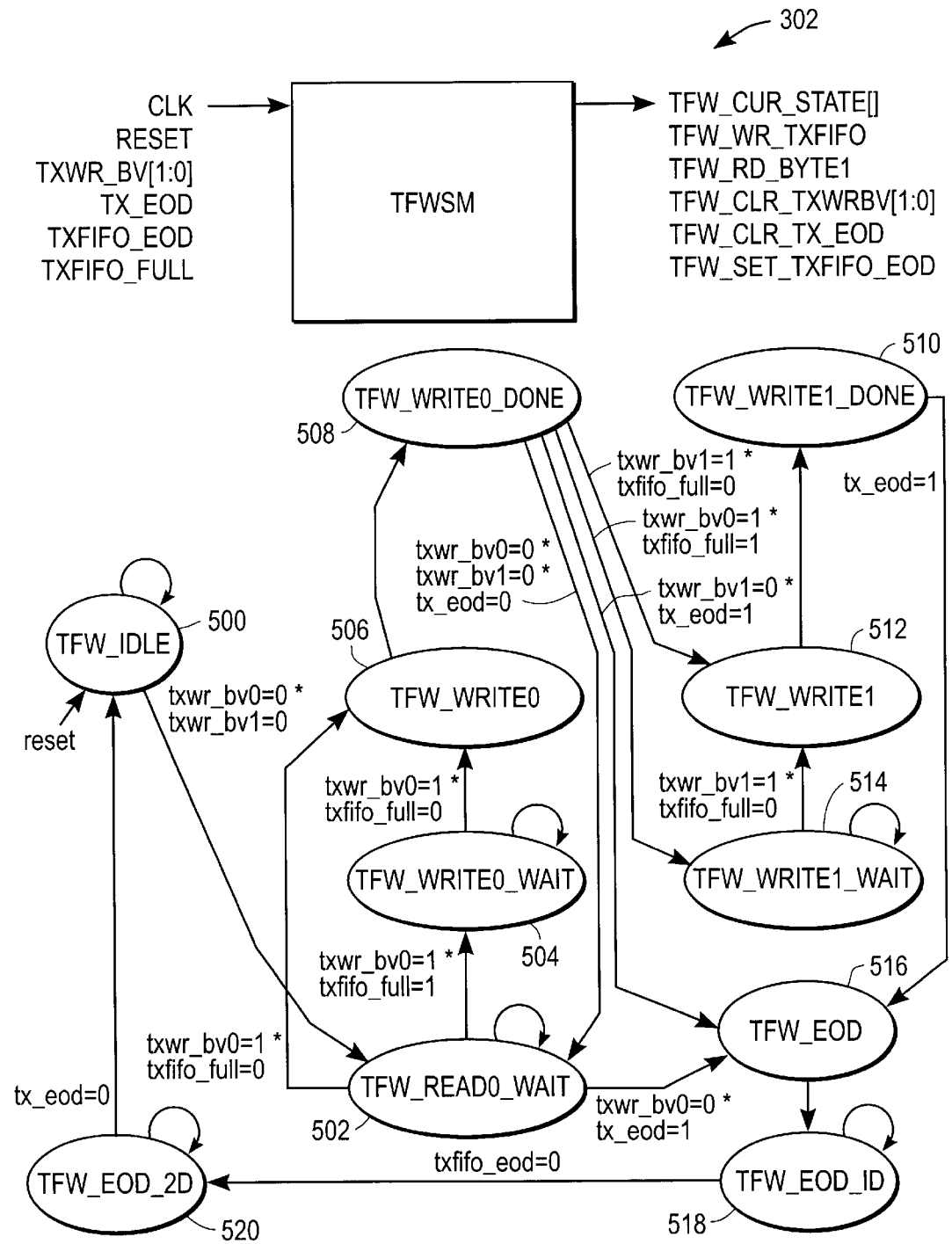
FIG. 5 is a diagram of an exemplary transmit state machine according to an embodiment of the invention.

The transmit FIFO write state machine (TFWSM) 302 is illustrated in greater detail in FIG. 5. The TFWSM 302 is responsible for writing data bytes that are written in the TXWR register 308 by the software via the XBUS. It also manages the TXWR buffer 308 via the byte-valid tag bits (BVO, BV1) and interfaces the CPU by generating the hold usbd_int_txwr interrupts to request more data into the TXWR register. It also takes care of odd byte data transfers and the end of packet processing for the transmit channel. The TFWSM 302 further controls the setting of TXFIFO_EOD tag bit that is used as a handshake signal with the UDSM state machine (FIG. 12). The TFWSM 302 implements a FIFO that is word (16 bit) writeable from the XBUS and byte readable (8 bits) from the UDSM.

Upon reset, the TFWSM 302 enters an idle state (TFW_IDLE) 500. While the byte_valid tag bits (txwr_bv0, txwr_bv1) are still low, the state machine transitions to state 502 (TFW_READ0_WAIT) wait to read byte 0 from the TXWR 308. When the txfifo_full and txwr_bv0 are high, the state machine waits in state 504 (TFW_WRITE0_WAIT) to write byte 0 into the TX FIFO 300. When txfifo full goes high, the byte 0 is written into the TXFIFO in state 506 (TFW_WRITE0). When the byte 0 write is finished, the FIFO status bits are updated in state 508 (TFW_WRIE0_DONE). If both byte valid bits (txwr_bv0, txwr bv1) are low, and the end of data bit is low, the system proceeds to process and synchronize the end of data in states 516, 518, 520 (TFW_EOD, TFW_EOD_1D, TFW_EOD_2D). If txwr_bv1 is low, but tx_eod is high, then the state machine will transition to wait to write byte 1 into the TXFIFO in state 514 (TFW_WRITE1_WAIT). If txwr_bv1 and txfifo_full are both high, then the state machine will write the byte 1 into the FIFO in state 512 (TFW_WRITE1). When the write is finished, in state 510 (TFW_WRITE1_DONE), if not the end of data, the state machine will transition to wait to read the next byte from the TXWR.

The states of the TFWSM are summarized in Table 1below:

TABLE 1

| STATE | |
|---|---|
| TFW_IDLE | Idle state just after reset |
| TFW_READ0_WAIT | Wait to read byte 0 from TXWR |
| TFW_WRITE0_WAIT | Wait to write byte 0 into TXFIFO |
| TFW_WRITE0 | Write byte 0 into TXFIFO |
| TFW_WRITE0_DONE | Ensures the byte 0 write into the TXFIFO is complete and the FIFO status bits are updated. |
| TFW_WRITE1_WAIT | Wait to write byte 1 into the TXFIFO |
| TFW_WRITE1 | Write byte 1 into TXFIFO |
| TFW_WRITE1_DONE | Ensures the byte 1 write into the TXFIFO is complete and the FIFO status bits are updated. |
| TFW_EOD | Process transmit end of data |
| TFW_EOD_ID | Sync delay 1 state after TFW_EOD |
| TFW_EOD_ID2 | Sync delay state 2 after TFW_EOD |

Figure 6:
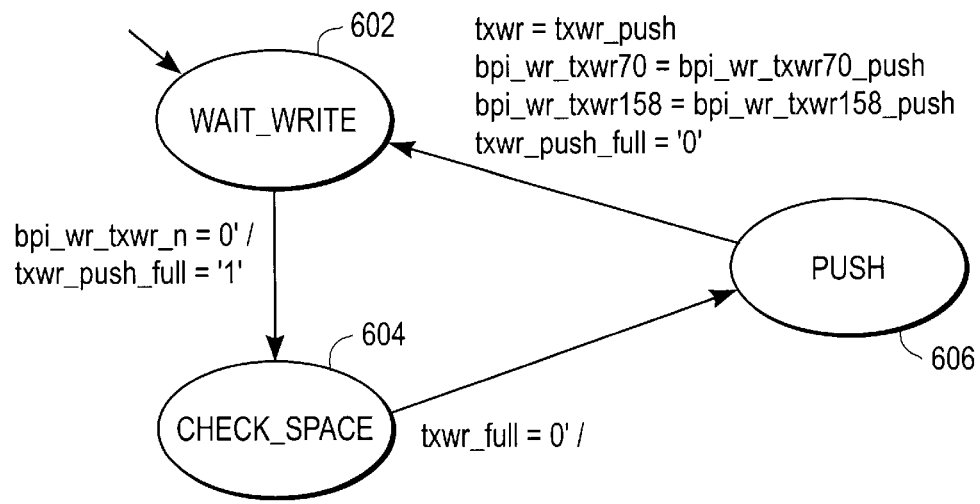
FIG. 6 illustrates a transmit push (TXPUSH) state machine according to an embodiment of the invention.
Figure 7:
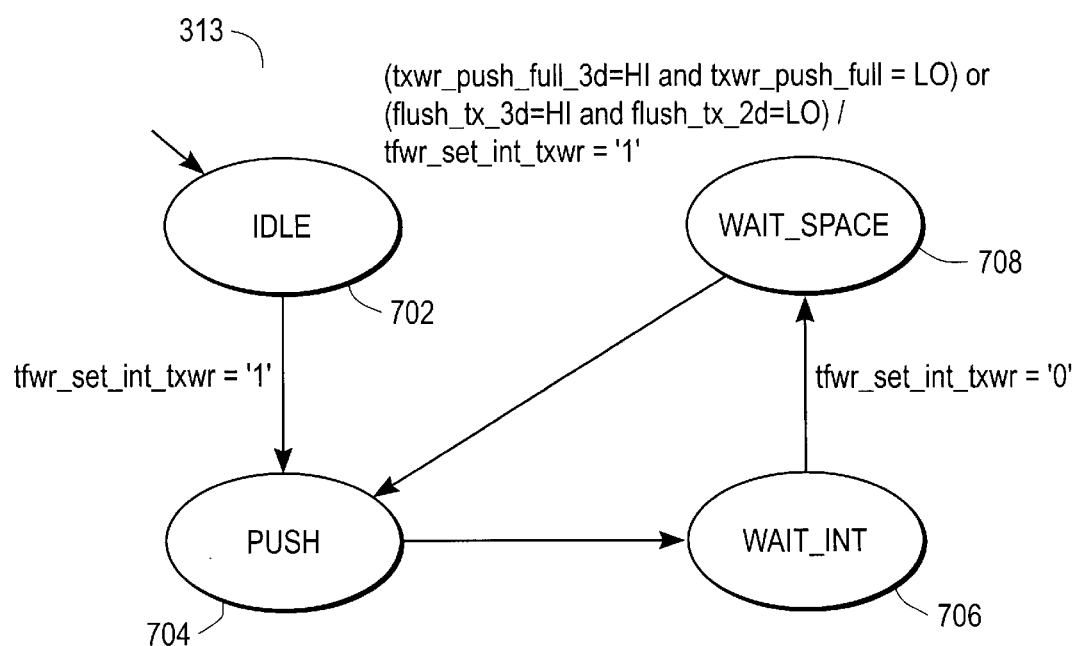
FIG. 7 illustrates a transmit interrupt (TXINT) state machine according to an embodiment of the invention.

The TXPUSH 312 and TXINT 313 state machines are described below with reference to FIGS. 6 and 7. The TXPUSH state machine 312 keeps track of whether the TXWR register 308 is available and the push buffers can be moved. Thus, from an initial state 602 (WAIT_WRITE), when txwr push full is high, the state machine will check if the TXWR buffer is full in state 604 (CHECK_SPACE). If the TXWR buffer is available, the contents of the push buffer can be moved (state 606).

The TXINT state machine 313 (FIG. 7) determines whether the TXWR register is empty and, if its is empty and there is a write from the XBUS, on the next clock cycle an TXWR interrupt will be generated and the TXWR_PUSH register will be empty for the next write. After the IDLE state 702, the transfer interrupt is generated, and the data pushed from the FIFO (state 704). The EPEC 105 then waits a predetermined number of clock cycles (state 706) until the next data word has passed through (state 708), and then another interrupt is generated.

Receive Block

Figure 8:
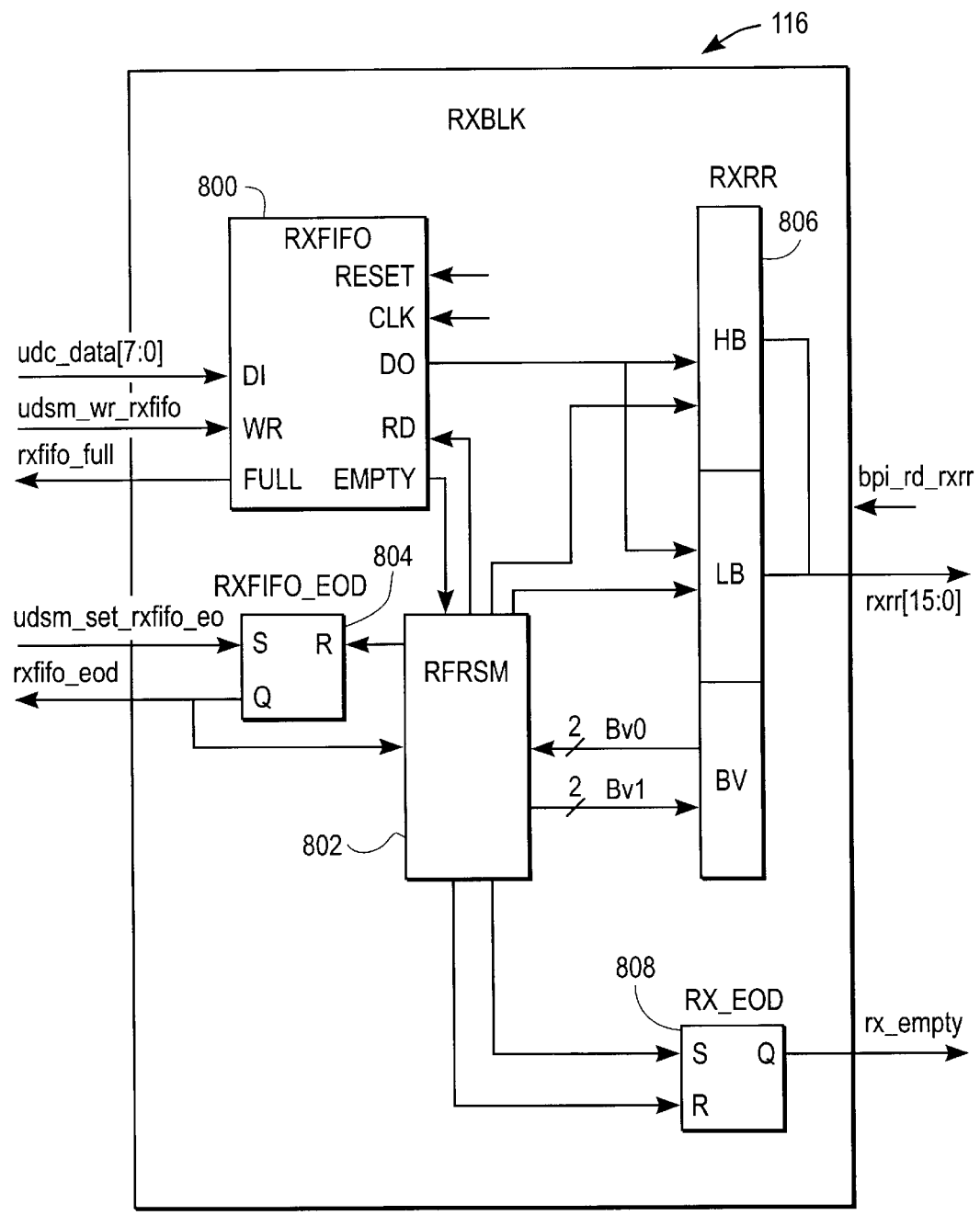
FIG. 8 is a diagram of an exemplary receive FIFO according to an embodiment of the invention.

The Receive Block 116 is illustrated in greater detail with reference to FIG. 8. As shown, the receive block 116 includes a receive FIFO (RXFIFO) 800, a 16 bit receive data read register (RXRR) 806 readable from the Xbus, and a receive FIFO read state machine (RFRSM) 802 to handle the data transfer between the Receive FIFO 800 and the RXRR register 806. The receive block provides a receive channel that interfaces to the Xbus via a 16 bit interface and to the UDSM via an 8 bit interface. The RXFIFO, the RFRSM, and the RXRR register all belong to the USBD_CLK domain.

When data is ready to be read from the RXRR register 806, the RFRSM 802 generates a receive data ready interrupt (set_int_rxrr) for the corresponding channel to inform the software to read the received data. Byte valid tag bits (BV0, BV1) are used by the RFRSM 802 to indicate valid bytes in the RXRR register 806. An XBUS read of the RXRR register 806 clears both these tag bits asynchronous (synchronous to Xbus clock) as a side effect of the read. Receive end of data is indicated by setting a 1 bit register RXEOD 804 along with generating the corresponding interrupt (set_int_rxeod) for the corresponding channel.

The receive FIFO 800 is a dual port synchronous FIFO 8 elements deep and 8 bits wide. The Write port (WR) is controlled by the UDSM state machine (FIG. 12) and the Read port (RD) is controlled by the RFRSM state machine 802. The receive FIFO 800 is generally similar to the transmit FIFO.

Figure 9:
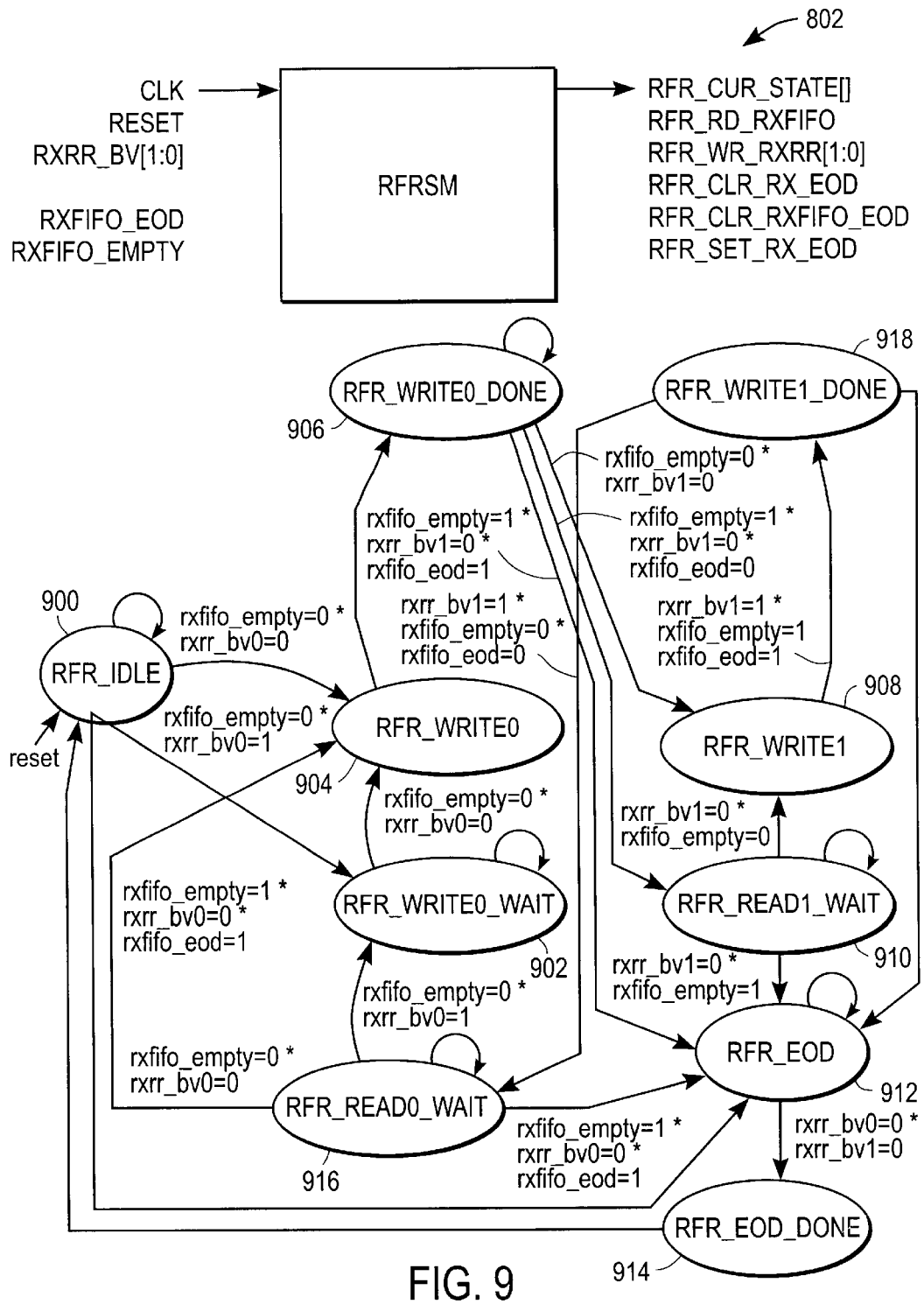
FIG. 9 illustrates a receive FIFO according to an embodiment of the invention.

The receive FIFO read state machine (RFRSM) 802 is illustrated in greater detail in FIG. 9. The RFRSM 802 reads the data bytes from the RXFIFO 800 and writes it to the RXRR register 806, in effect providing a byte stream to word-stream conversion. Further, when word data is ready in the RXRR 806, the RFRSM 802 generates the set_int_rxrr data ready interrupt signal to the EPEC. Further, the RFRSM 802 implements a FIFO that is byte writable by the UDSM and word writeable by the Xbus. Further, the RFRSM 802 generates the receive end of data interrupt when the last data byte is read by the EPEC to inform that there is no more data to be read in the current packet in the current channel.

From an initial IDLE state (900), if an end of data is received, the end of data will be processed (states 912, 914). If the byte 0 is in the RXFIFO but the RXRR register 806 is not available then RFR_WRITE0_WAIT state (902) is entered. Once the RXRR 806 is indicated to be available, data is written into it RFR_WRITE0 (state 904). When the write of byte 0 is done (RFR_WRITE0_DONE) in state 906, either an end of data is processed (state 912), or the byte 1 is processed. If data is not available from the RXFIFO, a wait state 910 is entered (RFR_READ1_WAIT). Once the data are available, the byte 1 is written to the RXRR 806 (state 908). Once the write of byte 1 is finished, the system will either process an end of data (state 912) or will wait for the next byte 0 (state 916) to be available in the RXFIFO 800.

The receive FIFO Read State Machine's states are summarized in Table 2 below:

TABLE 2

| STATE | |
|---|---|
| RFR_IDLE | Idle state just after reset, wait in this state until RXFIFO is non-empty or rx_eod is reached |
| RFR_READ0_WAIT | Wait to read byte 0 from RXFIFO. Wait in this state until RXFIFO is non-empty or rx_eod is reached |
| RFR_WRITE0_WAIT | Wait to write byte 0 into RXRR register. Byte 0 data is available in the RXFIFO but RXRR is not available. |
| RFR_WRITE0 | Write byte 0 into RXRR |
| RFR_WRITE0_DONE | Wait until write byte 0 into RXRR is complete |
| RFR_READ1_WAIT | Wait to write byte 1 from RXFIFO. Wait in this state until RXFIFO is non-empty or RX_EOD is reached |
| RFR_WRITE1 | Write byte 1 into RXRR |
| RFR_WRITE1_DONE | Wait untii write byte 1 into RXRR is complete |
| RFR_EOD | Process receive EOD |
| RFR_EOD_DONE | Processing of RX_EOD is complete |

USB Device Interface Block (UDBLK)

Figure 10:
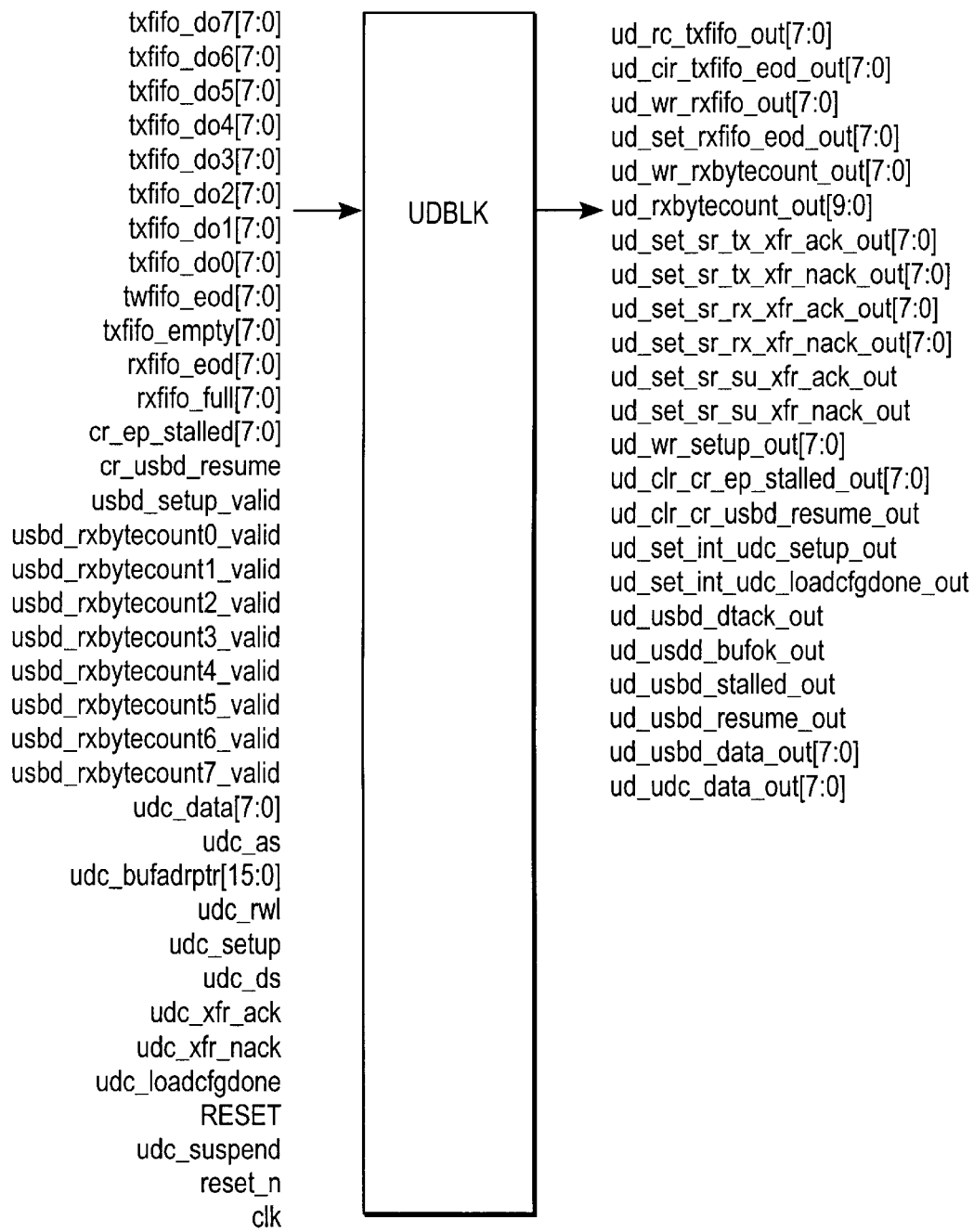
FIG. 10 illustrates the UDBLK according to an embodiment of the invention.

The USB device interface block signals are illustrated in FIG. 10. The UDBLK includes the USB Device State Machine (UDSM)(FIG. 11) and the multiplexing logic needed to multiplex the current active transmit/receive endpoint channel with the UDSM. The multiplexing is transparent to the UDSM, i.e., the UDSM does not know of the existence of the eight transmit/receive endpoint channels. It is designed to operate as if there is only one such channel from which it receives transmit data and one receive channel to which it writes data. The UDBLK belongs to the USDB_CLK domain.

Figure 11:
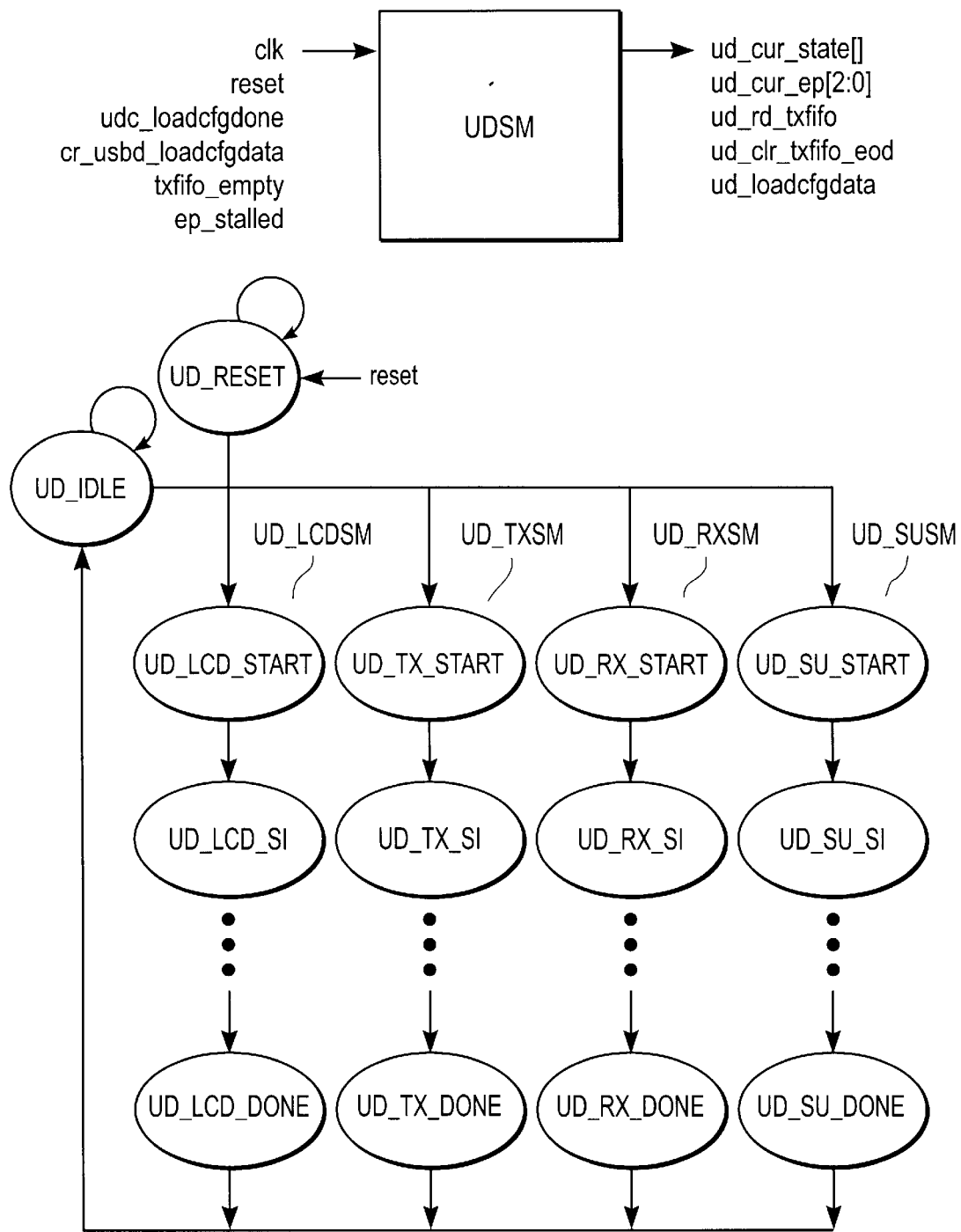
FIG. 11 illustrates the UDSM according to an embodiment of the invention.

The USB device state machine (UDSM) is illustrated in FIG. 11. The UDSM interfaces the UDC over its application bus and handles all the UDC transactions that are generated by the UDC. The USDM includes four sub state machines, as will be described in greater detail below.

Load Configuration Data State Machine (UD_LCDSM)

The Load Configuration Data State Machine is illustrated in FIG. 12. The UDSM remains in the reset state (UD_RESET) 1200 while reset_n is asserted. When it is de-asserted, the load configuration data sequence is begun by transitioning to the start state 1202 (UD_LCD_START). The UDSM remains in the UD_LCD_START state until load configuration data appears in the TXFIFO. When a data byte is ready in the TXFIFO, it is loaded to the UDC in state 1204 (UD_LCD_LOADCFGDATA). When the byte has been loaded, the UDSM waits in state 1206 (UD_LCD_CHECK_LOADCFGDATA) for the UDC to return a udc_loadcfgdone signal. If it is asserted, then the TXFIFO 300 is flushed, in state 1210 (UD_LCD_FLUSH_TXFIFO). Once flushed, the UDSM transitions from a done state 1214 to an idle state 1216. If the udc_loadcfgdone signal had not been asserted, then a wait state 1208 (UD_LCD_LOADCFGDATA_WAIT) is entered until the configuration data arrives in the TXFIFO 300.

The states of the Load Configuration Data State Machine are summarized in Table 3 below:

TABLE 3

| State | |
|---|---|
| UD_LCD_RESET | This is the reset state. UDSM remains in this state for as long as the reset_n is asserted low. When the reset_n is de-asserted, it starts the load configuration data sequence by going to the UD_LCD_START state |
| UD_LCD_START | Wait in this state for load configuration data to appear in the TXFIFO |
| UD_LCD_LOADCFGDATA | Load the configuration data byte that is ready in the TXFIFO to the UDC |
| UD_LCD_CHECK_LOADCFGDONE | Check for load configuration done indication from the UDC. If the UDC_LOADCFGDONE signal is asserted, then flush the TXFIFO. |
| UD_LCD_LOADCFGDATA_WAIT | In this state UDSM waits for configuration data to arrive in the TXFIFO |
| UD_LCD_FLUSH_TXFIFO | Flush the TXFIFO until TX_EOD is set. This is needed if the XBUS software sends more bytes than is necessary for the configuration of UDC. |

TABLE 3-continued

| State | |
|---|---|
| UD_LCD_DONE | Configuration of the UDC is done. Go to the UD_IDLE state and wait for the next action. |

Transmit Data State Machine (UD_TXSM)

Figure 13:
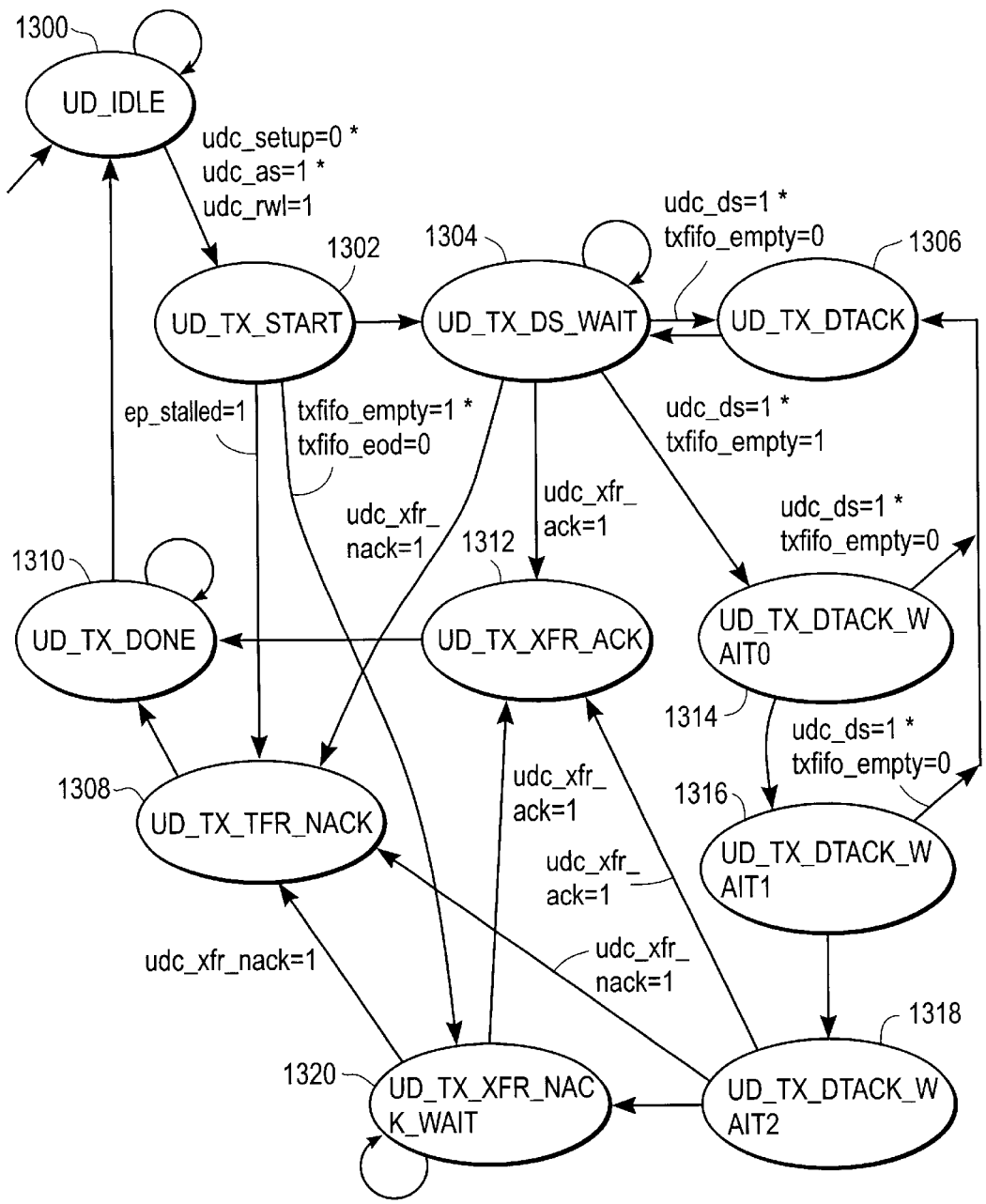
FIG. 13 illustrates a Transmit Data state machine according to an embodiment of the invention.

The transmit data state machine is shown in FIG. 13. No data available results in a NACK. After a packet is transferred, the system reads a status bit from the USBD_STATUS_REG1 register to determine whether the transfer was ACKed or NACKed by the host. From the idle state 1300 (UD_IDLE), the UDSM transitions to the start state 1302 (UD_TX_START).

The UDSM then transitions to wait for a data strobe from the UDC in state 1304 (UD_TX_DS_WAIT). The UDSM will wait in states 1314,1316 (UD_TX_DTACK_WAIT0, UD_DTACK_WAIT1) for three clocks after the data strobe for transmit data to arrive in the TXFIFO 300. Once the TX data has been received, the TX data transfer ACK is asserted in state 1306 (UD_TX_DTACK). The fourth clock wait (state 1318) after the data strobe (UD_TX_DTACK_WAIT2) the UDSM times out and may return a NACK in state 1308 (UD_TX_TFR_NACK). Otherwise, the UDSM will wait for an ACK or NACK in state 1320 (UD_TX_XFR_NACK_WAIT) or return an ACK in state 1312 (UD_TX_XFR_ACK). Once the ACK/NACK is received, the transfer is done in state 1420 (UD_TX_DONE).

The states of the UUD_TXSM are summarized in Table 4 below:

TABLE 4

| State | |
|---|---|
| UD_TX_START | This is the starting state of the transmit process |
| UD_TX_DS_WAIT | Wait for a data strobe from UDC |
| UD_TX_DTACK | Assert TX data transfer ack |
| UD_TX_DTACK_WAIT0 | Wait for TX data to arrive in the TXFIFO. (2d clock wait after data strobe) |
| UD_TX_DTACK_WAIT1 | Wait for TX data to arrive in the TXFIFO. (3d clock wait after data strobe) |
| UD_TX_DTACK_WAIT1 | Wait for TX data to arrive in the TXFIFO. (4th clock wait after data strobe). This state indicates a time out of UDSM waiting for the TX data. |
| UD_TX_XFR_NACK | UDC sends a NACK for the previous TX packet |
| UD_TX_XFR_NACK_WAIT | Wait for a NACK/ACK from he UDC |
| UD_TX_XFR_ACK | Sends an ACK for the previous TX packet |
| UD_TX_DONE | TX packet transmission is complete. Go back to the UD_IDLE state. |

Receive Data State Machine (UD_RXSM)

Figure 14:
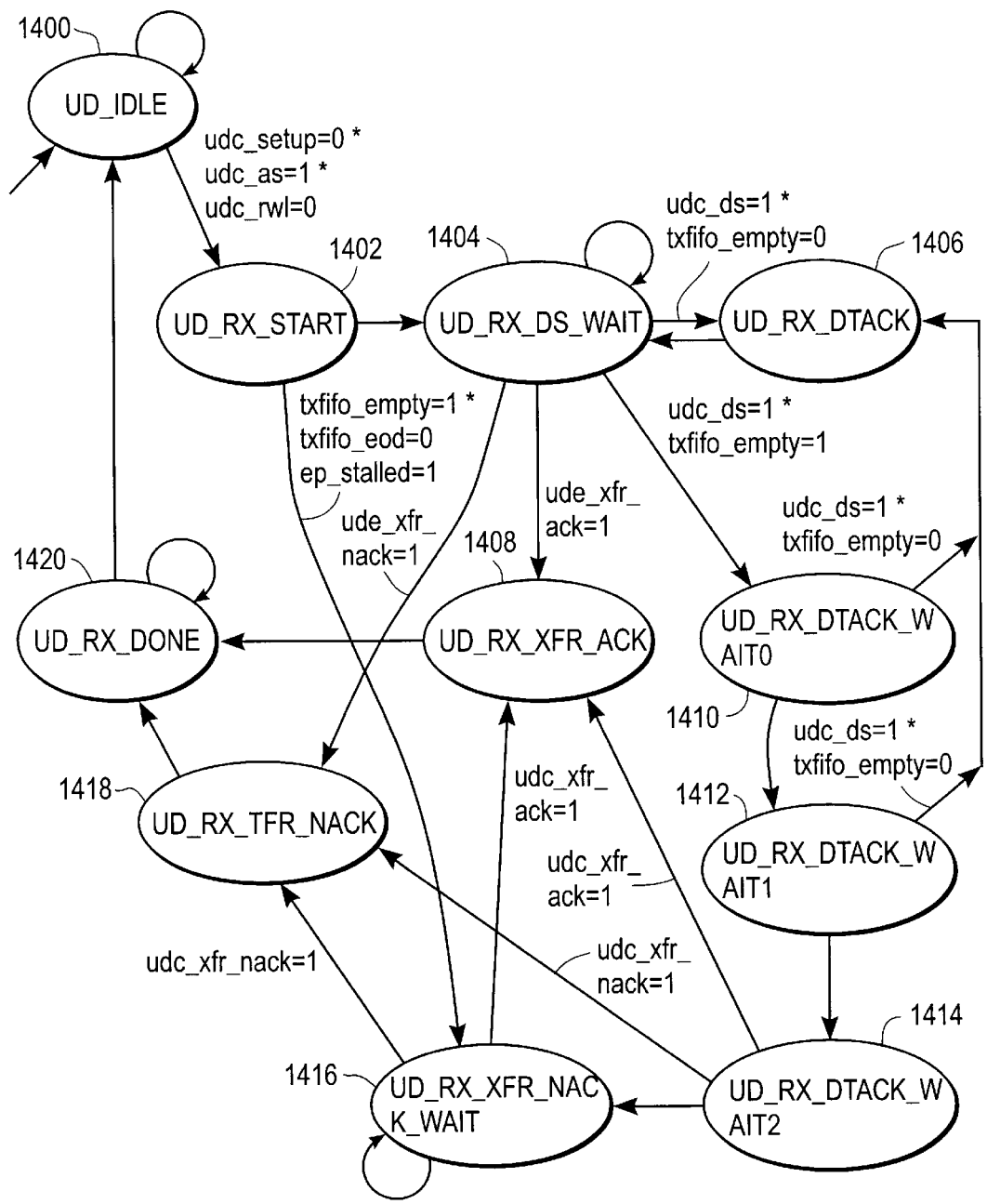
FIG. 14 illustrates a Receive Data state machine according to an embodiment of the invention.

The Receive Data State Machine is illustrated in FIG. 14. From the idle state 1400 (UD_IDLE), the UDSM transitions to the start state 1302 (UD_RX_START). The UDSM then transitions to wait for a data strobe from the UDC in state 1404 (UD_RX_DS_WAIT). The UDSM will wait in states 1410, 1412 (UD_RX_DTACK_WAIT0, UD_RX_DTACK_WAIT1) for three clocks after the data strobe for receive data to arrive in the RXFIFO. Once the RX data has been received, the RX data transfer ACK is asserted in state 1406 (UD_RX_DTACK). The fourth clock wait (state 1R18) after the data strobe (UD_RX_DTACK_WAIT2) the UDSM times out and may return a NACK in state 1418 (UD_RX_TFR_NACK). Otherwise, the UDSM will wait for an ACK or NACK in state 1416 (UD_TX_XFR_NACK_WAIT) or return an ACK in state 1408 (UD_TX_XFR_ACK). Once the ACK/NACK is received, the transfer is done in state 1420 (UD_RX_DONE).

The states are summarized in Table 5 below:

TABLE 5

| State | |
|---|---|
| UD_RX_START | This is the starting state of the receive process |
| UD_RX_DS_WAIT | Wait for RX data and data strobe from UDC |
| UD_RX_DTACK | RX data has been received from UDC, send a data transfer ACK to UDC |
| UD_RX_DTACK_WAIT0 | Next byte of RX packet is ready, but RXFIFO is fill. Wait for RXFIFO to have space available for the RX data byte (clock 2 wait). |
| UD_RX_DTACK_WAIT1 | Next byte of RX packet is ready, but RXFIFO is fill. Wait for RXFIFO to have space available for the RX data byte (clock 3 wait). |
| UD_RX_DTACK_WAIT2 | Next byte of RX packet is ready, but RXFIFO is fill. Wait for RXFIFO to have space available for the RX data byte (clock 4 wait). |
| UD_RX_XFR_NACK | Receive a NACK for the RX packet from UDC |
| UD_RX_XFR_NACK_WAIT | Wait for a NACK/ACK for the RX packet from the UDC |
| UD_RX_XFR_ACK | Receive an ACK for a RX packet from the UDC |
| UD_RX_DONE | RX packet reception is complete. Go back to the UD_IDLE state. |

Set Up Transaction State Machine (UD_SUSM)

Figure 15:
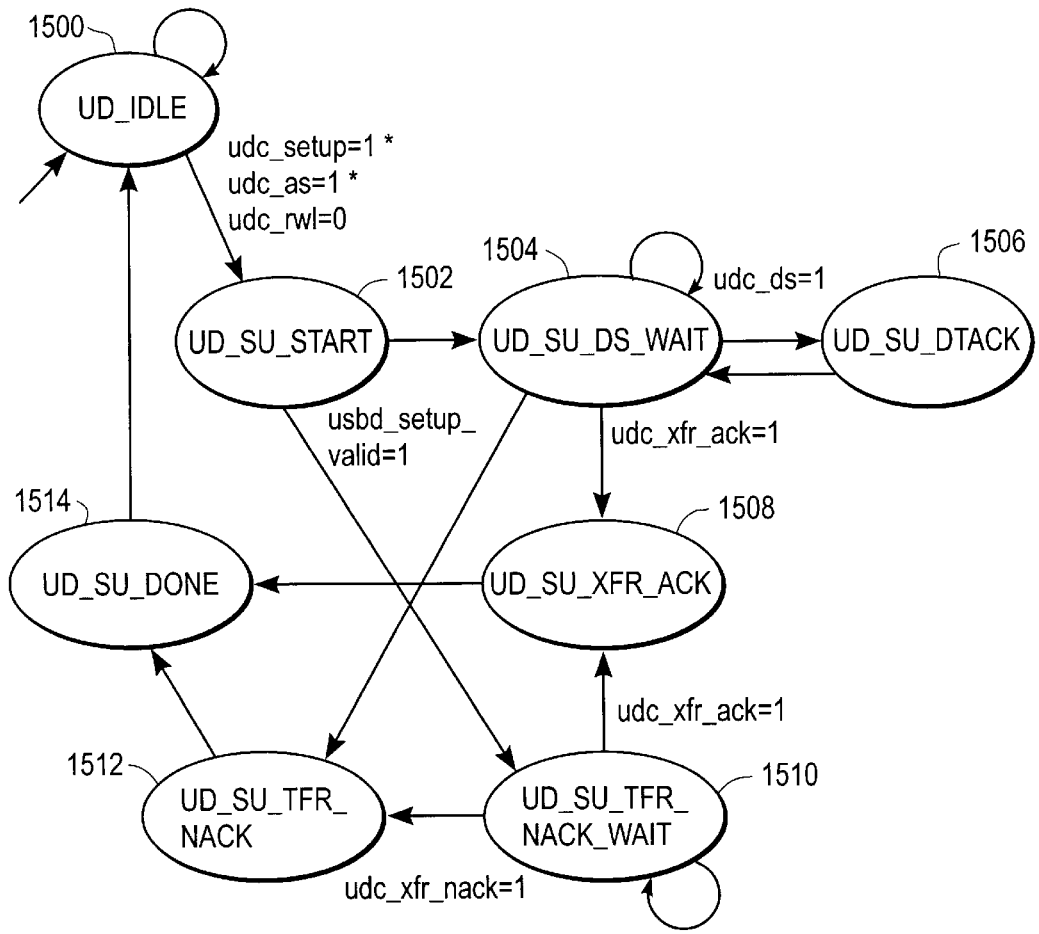
FIG. 15 illustrates a Set Up state machine according to an embodiment of the invention.
Figure 16:
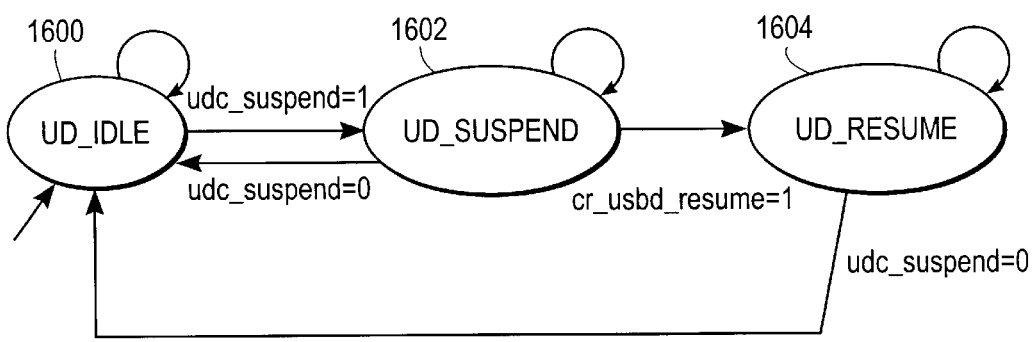
FIG. 16 illustrates a Suspend/Resume state machine according to an embodiment of the invention.

The Set Up transaction state machine is illustrated in FIG. 15. From the idle state 1500 (UD_IDLE) the UDSM transitions to the start state 1502 (UD_SU_START). In state 1504 (UD_SU_DS_WAIT), the UDSM waits for the data strobe indicative of a next data byte from the UDC. Once received, the UDSM sends an ACK to the UDC in state 1506 (UD_SU_DTACK). The UDSM then may receive a NACK in state 1512 (UD_SU_TFR_NACK) or in state 1508 (UD_SU_XFR_ACK), an ACK from the UDC for the latest packet. The UDSM then transitions to the done state 1514 (UD_SU_DONE). From the start state 1502, the UDSM may also transition to state 1510 to wait for a NACK/ACK from the UDC.

The states for the set up state machine are summarized in Table 6 below:

TABLE 6

| State | |
|---|---|
| UD_SU_START | Start the reception of a set up packet from the UDC |
| UD_SU_DS_WAIT | Wait for the next setup data byte from UDC |
| UD_SU_DTACK | Send a data transfer ACK to the UDC |
| UD_SU_XFR_NACK | Receive a NACK for the latest set up packet from UDC |
| UD_SU_XFR_NACK_WAIT | Wait for a NACK/ACK for the latest set up packet from the UDC |
| UD_SU_XFR_ACK | Receive an ACK for the latest set up packet from the UDC |
| UD_SU_DONE | Set up packet reception is complete. Go back to the UD_IDLE state. |

UDC Suspend/Resume Sequence State Machine

From the idle state 1600 (UD_IDLE), a suspend request may be received from the UDC. In response, in state 1602 (UD_SUSPEND), the suspend interrupt is generated. When the UDC de-asserts the suspend signal, normal operation is resumed, in state 1604 (UD_RESUME). The states of the UDC Suspend/Resume state machine are summarized in Table 7 below:

TABLE 7

| State | |
|---|---|
| UD_IDLE | This is the main idle state of the UDSM. Wait for a request from the UDC |
| UD_SUSPEND | Received a suspend request from the UDC. Generate UDC_SUSPEND interrupt |
| UD_RESUME | UDC has de-asserted the UDC_SUSPEND signal. |

USBD Register Block (RBLK)

The RBLK contains the registers that are defined for the USBD block. It also contains the RxByteCount registers for all the eight channels.

USBD Generate Interrupt Pulse Block (GIPBLK)

The GIPBLK 112 (FIG. 2) contains the logic needed to take all the interrupts that are generated in the USBD-CLK domain and synchronize them to the X_CLK and also guarantee the interrupt pulse to be always 2 X_CLK wide. The basic synchronization and pulse shaping function is performed by a Generate Interrupt Pulse State Machine (GIPSM), as will be described in greater detail below. The following interrupts are synchronized:

USBD_SET_INT_RXRR, USBD_SET_INT_RX_DONE,

USBD_SET_INT_TX_DONE, USBD_SET_INT_UDC_SOF,

USBD_SET_INT_UDC_SUSPEND, USBD_SET_INT_UDC_SUSPENDOFF,

USBD_SET_INT_UDC_LOADCFGDONE, and

USBD_SET_INT_UDC_SETUP.

Figure 17A:
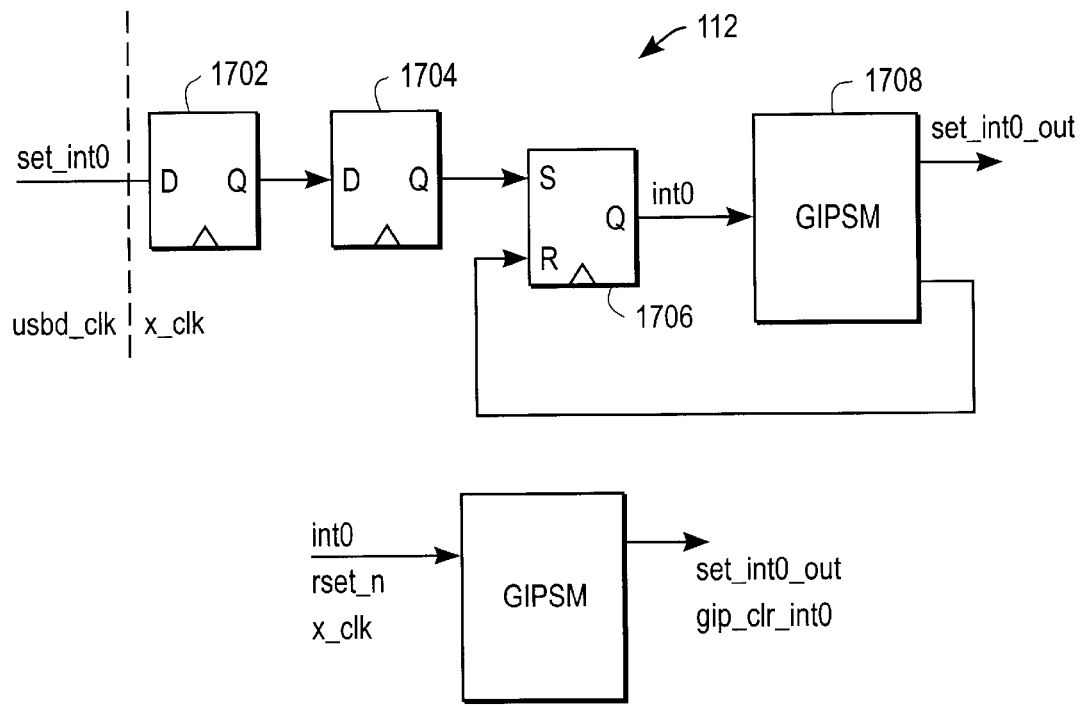
FIGS. 17A and 17B illustrate interrupt pulse generation and synchronization according to an embodiment of the invention.

The GIPBLK is illustrated in FIG. 17A and includes the GIPSM 1708 a pair of D flip flops 1702,1704, and an SR flip flop 1706. The set_int0 signal is received from the USBD_CLK domain. The flip flops 1702–1704 and the GIPSM 1708 are in the X_CLK domain. The flip flops 1702–1706 serve to synchronize the incoming set-int0 to the GIPSM 1708 as the into signal. The GIPSM 1708 generates the set_int_0out signal. The SR flip flop 1706 is reset by the gip_clr_int0 signal from the GIPSM 1708.

Figure 17B:
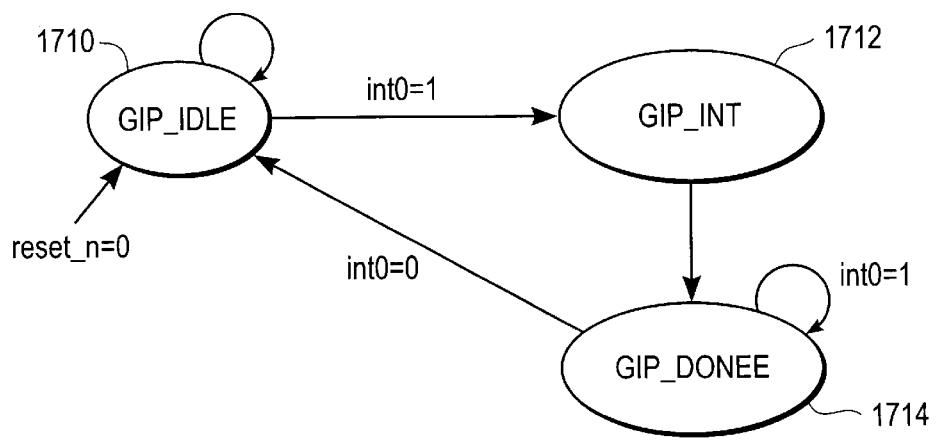

The GIPSM 1708 is illustrated in greater detail in FIG. 17B. On reset, the GIPSM 1708 enters an idle state 1710 (GIP_IDLE). If into is active, then the generate interrupt state 1712 (GIP_INT) is entered. Once the interrupt is generated, the interrupt done state 1714 (GIP_DONE) is entered, and the GIPSM 1708 returns to the idle state 1710.

What is claimed is:

1. A bus interface system for interfacing between a first bus and a second bus, comprising:
   a transmit multiplexer coupled to the first bus;
   a plurality of transmit channels multiplexed by the transmit multiplexer to transmit data to said first bus, said plurality of transmit channels each including a transmit block having at least one dedicated transmit FIFO buffer for interfacing to said first bus and at least one interface register for interfacing to said second bus;
   a receive multiplexer coupled to the first bus; and
   a plurality of receive channels multiplexed by the receive multiplexer to receive data from said first bus, said plurality of receive channels each including a receive block having at least one dedicated receive FIFO buffer for interfacing to said first bus and at least one interface register for interfacing to said second bus;
   wherein at least one of said transmit block and receive block includes a control state machine.

2. A bus interface system in accordance with claim 1, said transmit block including at least one control state machine.

3. A bus interface system in accordance with claim 2, said control state machine in said transmit block and said transmit FIFO buffer operating on a first bus clock, and said transmit interface register operating on a second bus clock.

4. A bus interface system in accordance with claim 1, said receive block including at least one control state machine.

5. A bus interface system in accordance with claim 4, said control state machine in said receive block, said receive FIFO buffer, and said receive interface register operating on a first bus clock.

6. A bus interface system for interfacing between a first bus and a second bus, comprising:
   a transmit multiplexer coupled to the first bus;
   a plurality of transmit channels multiplexed by the transmit multiplexer to transmit data to said first bus, said plurality of transmit channels each including first means having at least one dedicated transmit FIFO buffer for interfacing to said first bus and at least one interface register for interfacing to said second bus;
   a receive multiplexer coupled to the first bus; and
   a plurality of receive channels multiplexed by the receive multiplexer to receive data from said first bus, said plurality of receive channels each including second means having at least one dedicated receive FIFO buffer for interfacing to said first bus and at least one interface register for interfacing to said second bus
   wherein at least one of said first means and second means includes a control state machine.

7. A bus interface system in accordance with claim 6, said first means including at least one control state machine.

8. A bus interface system in accordance with claim 7, said control state machine in said first means and said transmit FIFO buffer operating on a first bus clock, and said transmit interface register operating on a second bus clock.

9. A bus interface system in accordance with claim 6, said second means including at least one control state machine.

10. A bus interface system in accordance with claim 9, said control state machine in said second means, said receive FIFO buffer, and said receive interface register operating on a single bus clock.

* * * * *